United States Patent Office 3,647,855
Patented Mar. 7, 1972

3,647,855
PURIFICATION OF ADIPONITRILE CONTAINING FRACTIONS
Maomi Seko, Tokyo, and Yasunobu Takahashi, Takeaki Iwamoto, and Shikazo Seno, Miyazaki-ken, Japan, assignors to Asahi Kasei Kogyo Kabushiki Kaisha, Osaka, Japan
No Drawing. Filed Feb. 25, 1969, Ser. No. 802,254
Claims priority, application Japan, Feb. 29, 1968, 43/13,071; Aug. 31, 1968, 43/62,196
Int. Cl. C07g 121/26
U.S. Cl. 260—465.8        18 Claims

ABSTRACT OF THE DISCLOSURE

Purification of crude adiponitrile containing acrylonitrile, propionitrile, hydroxypropionitrile and bis-cyanoethyl ether (BCE) by decomposing the BCE by treating the crude at about 0 to 400° C. in the presence of preferably about 0.001 to 0.1 mole of a polyvalent metal catalyst in a valence state of at least 3 per mole of BCE. The metal catalyst is at least one compound of chromium, manganese, molybdenum, tungsten, and/or rhenium. The metal catalyst may be an oxide or alkali metal, alkaline earth metal, or ammonium compounds containing as the anionic portion thereof an oxygen-polyvalent metal moiety where the polyvalent metal is as stated above. Suitable anions include chromates, manganates, etc.; bichromates, permanganates, etc.; monosubstituted chromic sulfate, monosubstituted manganic sulfate, etc.

---

This invention relates to a method of purifying crude adiponitrile including adiponitrile, acrylonitrile, propionitrile, hydroxypropionitrile and bis-cyanoethyl ether. More particularly, it relates to a method of removing bis-cyanoethyl ether contained in the crude adiponitrile by heating the same in the presence of a particular catalyst.

It is known that acrylonitrile can be reductively dimerized by electrolysis to produce adiponitrile, with an undesirable formation of by-products, i.e., propionitrile, hydroxypropionitrile and bis-cyanoethyl ether (abbreviated to BCE hereinafter). When such crude adiponitrile is utilized, as it is, in a subsequent catalytic-hydrogenation process to produce hexamethylenediamine, these by-products or impurities present, together with the adiponitrile, damage the hydrogenation catalyst or tend to degrade the produced diamine. Therefore, these impurities should be effectively removed from crude adiponitrile before such adiponitrile is subjected to subsequent processing, particularly to subsequent hydrogenation.

Many attempts have been made to remove BCE from crude adiponitrile by rectification (distillation) thereof, but none of the existing methods has proved adequate; all have failed to effectively remove BCE when practiced on an industrial scale. For example, the small difference in the boiling points of BCE and adiponitrile necessitates the use of a rectification column provided with a large number of plates and BCE gradually decomposes to other impurities of different boiling points in the course of such rectification.

It was already reported by Monsanto Co. in Belgian Pat. No. 676299 (corresponding to U.S. Ser. No. 381,434 and 431,737), that an adiponitrile stream is upgraded by using, as a BCE decomposition catalyst, a quarternary ammonium hydroxide, potassium hydroxide, sodium hydroxide, calcium hydroxide or barium hydroxide. However, these strong alkaline catalysts cause undesirable troubles, such as cyclizing a portion of adiponitrile to iminocyanocyclopentane and promoting hydrolysis of adiponitrile to produce ω-cyanovaleramide in the presence of water.

It is therefore an object of this invention to provide an improved method of removing BCE from a crude adiponitrile including adiponitrile, acrylonitrile, propionitrile, hydroxypropionitrile and BCE.

Other and additional objects of this invention will become apparent from a consideration of this entire specification, including the claims hereof.

In accordance with, and fulfilling these objects, one aspect of the present invention includes the decomposition of BCE without forming by-products by heating thereof with, as a catalyst, at least one compound selected from the group consisting of oxides of chromium, manganese, molybdenum, tungsten, and rhenium; chromates, manganates, molybdates, tungstates, and rhenates of alkali metals; bichromates, permanganates, permolybdates, pertungstates, and perrhenates of alkali metals; chromates, bichromates, manganates and permanganates of alkaline earth metals; ammonium chromate; alkali metal monosubstituted manganic sulfate represented by a general formula $M \cdot Mn(SO_4)_2$, with M representing an alkali metal; and alkali metal monosubstituted chromic sulfate represented by a general formula $M \cdot Cr(SO_4)_2$ with M as defined above. It is noted that the valency of first above mentioned metal is not lower than 3.

Examples of oxides of chromium include chromium (III) oxide $Cr_2O_3$ and chromium (IV) oxide $CrO_2$; chromium (VI) oxide $CrO_3$; those of manganese include manganese (III) oxide $Mn_2O_3$, manganese (IV) oxide $MnO_2$ and trimanganese tetraoxide $Mn_3O_4$; those of molybdenum include molybdenum (IV) oxide $MoO_2$ and molybdenum (VI) oxide $MoO_3$; those of tungsten include the tungsten oxides $WO_2$, $W_4O_{11}$, $W_{10}O_{29}$, and $WO_3$; those of rhenium include rhenium (III) oxide $Re_2O_3$, rhenium (IV) oxide $ReO_2$, rhenium (VI) oxide $ReO_3$, and rhenium (VII) oxide $Re_2O_7$.

Chromates of alkali metals refer to those represented by a general formula $M_2CrO_4$ wherein M denotes an alkali metal, and chromates of alkaline earth metals refer to those represented by a general formula $M'CrO_4$ wherein M' denotes an alkaline earth metal.

Similarly, manganates of alkali metals refer to those represented by a general formula $M_2MnO_4$ with M defined as above, and manganates of alkaline earth metals refer to those represented by a general formula $M'MnO_4$ with M' defined as above.

Molybdates of alkali metals refer to those represented by a general formula $xM_2O \cdot yMoO_3$ where M denotes an alkali metal, x and y independently denote an integer.

Tungstates of alkali metals refer to orthotungstates of alkali metals represented by a general formula $M_2O \cdot WO_3$ with M as defined above; metatungstates of alkali metals represented by a general formula $M_2O \cdot 4WO_3$ or $M_2O \cdot W_4O_{12}$, with M as defined above; paratungstates of alkali metals represented by a general formula $3M_2O \cdot 7WO_3$ or $5M_2O \cdot 12WO_3$.

Rhenates of alkali metals refer to those represented by a general formula $M_2ReO_3$, $MReO_3$ and $M_2ReO_4$, with M defined as above.

Bichromates of alkali metals include those represented by a general formula $M_2Cr_2O_7$ with M defined as above, and bichromates of alkaline earth metals include those represented by a general formula $M'Cr_2O_7$ with M' defined as above. Polychromates of alkali metals and alkaline earth metals are also included.

As permanganates of alkali metals there are mentioned those represented by a general formula $MMnO_4$, wherein M is as defined above, such as potassium permanganate $KMnO_4$, sodium permanganate $NaMnO_4 \cdot 3H_2O$, and rubidium permanganate $RbMnO_4$. Permanganates of alkaline earth metals are those represented by general formula $M'(MnO_4)_2$, wherein M' is as defined above, such as calcium permanganate $Ca(MnO_4)_2 \cdot 5H_2O$.

As permolybdates of alkali metals those represented by a general formula $mM_2O \cdot nMoO_3 \cdot xO$, wherein M is as defined above, such as sodium permolybdate $Na_2O \cdot MnO_4$ and $NaMoO_4$, and potassium permolybdate $K_2O \cdot MoO_4$ and $KMoO_4$ are included; $m$, $n$, and $x$ independently denote an integer.

As pertungstates of alkali metals there may be mentioned those represented by a general formula $M_2W_2O_8$ or $M_2W_2O_9$ with M as defined above, such as sodium monopertungstate $Na_2O \cdot W_2O_7 \cdot 2H_2O$, sodium perditungstate $Na_2W_2O_9 \cdot 6H_2O$, and lithium perditungstate.

As perrhenates of alkali metals, there are mentioned those represented by a general formula $MReO_4$, wherein M is as defined above, such as potassium perrhenate $KReO_4$ and sodium perrhenate $NaReO_4$.

The use of permolybdates, pertungstates and perrhenates of alkaline earth metals is avoided in the present invention due to their poor solubilities in adiponitrile.

Further, those materials effectively used as catalysts according to the present invention include ammonium chromate, chromium alum $KCr(SO_4)_2 \cdot 12H_2O$, and manganese alum $KMn(SO_4)_2 \cdot 12H_2O$.

Alkali metals according to this invention may be exemplified by sodium, potassium, lithium, rubidium and cesium. Alkaline earth metals according to this invention may be exemplified by magnesium, calcium, strontium, barium.

Although a very small amount of catalyst, even as low as 0.0001 per mol of BCE, can be effective, the preferred amount of the catalyst ranges from 0.001 to 0.1 mol per 1 mol of BCE. The upper limit of the amount set forth is determined by economic considerations and operational parameters, and is not an operative limitation. Therefore, although BCE can be effectively decomposed with an equimolar amount or more of the catalyst, the use of such a greater amount of catalyst is usually not economically attractive.

The decomposition of BCE can be conducted at a reaction temperature ranging from 0 to 400° C., preferably from 150 to 230° C., in the presence of the specified amount of the catalyst compound.

The reaction time for a particular catalyst is governed by reaction temperature and other reaction conditions. It ordinarily ranges from about 10 seconds to several hours, depending upon the concentration of the catalyst and the reaction condition, including temperature.

To conduct the decomposition reaction of BCE, crude adiponitrile containing BCE is substantially brought into contact with the catalyst. For example, the catalyst may be dissolved or suspended in crude adiponitrile or in an aqueous solution; the catalyst may be dissolved in a suitable solvent such as acetonitrile, propionitrile, or dioxan and the solution then added to the crude adiponitrile; the catalyst may be dissolved or suspended in the solution of the crude adiponitrile dissolved in water or a suitable organic solvent; the crude adiponitrile or the solution thereof may be passed through a packed layer of solid catalyst particles; the crude adiponitrile vapor may be contacted with the surface of a solid catalyst; or other conventional methods to enable the contact between crude adiponitrile with the catalyst can be adopted.

Although the purification of the present invention may be conducted batchwise, in an industrial scale operation of the present invention, the purification operation may, of course, be continuously conducted, if necessary or desirable.

The advantages which the present invention can afford are remarkable in that, for example, the catalyst as used in the present invention neither consumes adiponitrile due to reaction or adiponitrile nor does it catalyze the formation of other impurities.

Further, the presence of impurities other than BCE, such as acrylonitrile, hydroxypropionitrile, water, etc., does not appreciably affect the function of the catalyst.

In accordance with the present invention, BCE is decomposed into acrylonitrile and hydroxypropionitrile, or into acrylonitrile and water, which can be easily removed from adiponitrile by distillation due to the great difference between the boiling points of these products and that of adiponitrile.

The acrylonitrile by-product thus formed by decomposition of BCE may be recovered and reused as a starting material for the production of adiponitrile, thus rendering the process more economically advantageous.

The features of the present invention can more fully be understood by the following non-limiting illustrative examples.

EXAMPLE 1

Into a three-necked flask equipped with a condenser, thermometer and capillary, there was charged crude adiponitrile (100 g.) containing 2% by weight of BCE, to which was added the catalyst (10 mg.) as listed below. The whole mixture was refluxed at 205° C. in nitrogen gas stream at 70 mm. Hg pressure for 20 minutes. Thereafter, BCE concentration of the reaction solution was measured with a gas chromatograph coupled with a hydrogen-flame ionization detector. The results are shown in Runs 1–16 of Table 1.

The catalyst used in Run 12 was a mixture of potassium permanganate (5 mg.) and potassium perchromate (5 mg.) and that used in Run 13 was a mixture of sodium manganate (5 mg.) and manganese dioxide (5 mg.).

In Runs 1–14, the formation of acrylonitrile and hydroxypropionitrile was observed. In Run 13, a large amount of imino-2-cyanocyclopentane was observed. In Runs 1, 3, and 10, a few peaks representing some unknown materials appeared in the gas chromatogram, but in each case the amount thereof was very small.

TABLE 1

| Run No. | Catalyst | BCE concentration detected after reaction, p.p.m. |
|---|---|---|
| 1 | Chromium (III) oxide, $Cr_2O_3$ | 3,000 |
| 2 | Chromium (IV) oxide, $CrO_2$ | (1) |
| 3 | Ammonium chromate, $(NH_4)_2CrO_4$ | (1) |
| 4 | Potassium bichromate, $K_2Cr_2O_7$ | (1) |
| 5 | Manganese (III) oxide, $Mn_2O_3$ | 400 |
| 6 | Trimanganese tetroxide, $Mn_3O_4$ | 700 |
| 7 | Potassium manganese alum, $KMn(SO_4)_2 \cdot 12H_2O$. | 500 |
| 8 | Manganese (IV) oxide, $MnO_2$ | 200 |
| 9 | Magnesium manganate, $Mg(MnO_4)_2$ | (1) |
| 10 | Potassium permanganate, $KMnO_4$ | (1) |
| 11 | A mixture of potassium permanganate and potassium bichromate, $KMnO_4 + K_2Cr_2O_7$. | (1) |
| 12 | A mixture of sodium manganate and manganese (IV) oxide, $Na_2MnO_4 + MnO_2$. | (1) |
| 13 [2] (reference) | Potassium hydroxide, KOH | 1,000 |
| 14 (reference) | No catalyst | 20,000 |

[1] Not detected.
[2] In this run, iminocyanocyclopentane and ω-cyanovaleramide were formed.

EXAMPLE 2

Runs 15–20 were conducted in the same manner as in Example 1 except that the amount of catalyst, temperature and pressure were altered as shown in Table 2. The time required for reducing the BCE concentration in the reaction solution to 50 p.p.m. was measured as an indication of the BCE decomposition ability of the catalyst. The results are tabulated in Table 2.

TABLE 2

| Run No. | Catalyst | Amount of catalyst added to the reaction solution, p.p.m. | Temperature (° C.) | Pressure (mm. Hg) | Time (min.) |
|---|---|---|---|---|---|
| 15 | Potassium bichromate, $K_2Cr_2O_7$ | [1] 2 | 205 | 70 | <1 |
| 16 | do | 100 | 205 | 70 | 3 |
| 17 | do | 5 | 205 | 70 | 40 |
| 18 | Potassium permanganate, $KMnO_4$ | 100 | 150 | 760 | 15 |
| 19 | do | 100 | 150 | 70 | 10 |
| 20 | do | 100 | 20 | 70 | 180 |

[1] Percent.

EXAMPLE 3

Crude adiponitrile obtained by reductive dimerization by electrolysis of acrylonitrile and thereafter subjected to an ordinary purification treatment (containing 90% adiponitrile (ADN), 1.7% BCE, a small amount of acrylonitrile, propionitrile, hydroxypropionitrile, water and α-methylglutaronitrile) was evaporated under the reduced pressure of 20 mm. Hg.

The vapor was passed through a 20 cm. long glass tube packed with manganese (IV) oxide at the flow rate of 2 cm./sec., whereupon the concentration of BCE was reduced to 50 p.p.m.

EXAMPLE 4

Into a three-necked flask equipped with a condenser, thermometer and capillary there was charged crude adiponitrile (100 g.) containing 2% by weight of BCE, to which was added a catalyst (10 mg.). The whole was heated to reflux at 205° C. in a nitrogen stream at 70 mm. Hg pressure for 20 minutes to carry out the reaction. The BCE concentration of the reaction solution was then measured with a gas chromatograph coupled to a hydrogen-flame-ionization detector. The results are shown in Table 3.

Runs 21–41 were operated with acrylonitrile and hydroxypropionitrile formed. In Run 40, a substantial amount of iminocyanocyclopentane was detected.

TABLE 3

| Run No. | Catalyst | BCE concentration after reaction (p.p.m.) |
|---|---|---|
| 21 | Molybdenum (IV) oxide $MoO_2$ | 3,500 |
| 22 | Molybdenum (VI) oxide, $MoO_3$ | 300 |
| 23 | Disodium molybdate, $Na_2MoO_4$ | 60 |
| 24 | Sodium molybdate, $Na_2O \cdot 2MoO_3$ | 80 |
| 25 | Potassium permolybdate, $KMoO_4$ | (1) |
| 26 | Tungsten (IV) oxide, $WO_2$ | 2,400 |
| 27 | Tungsten (VI) oxide, $WO_3$ | 200 |
| 28 | Sodium ortho tungstate, $Na_2O \cdot WO_3$ | 50 |
| 29 | Sodium metatungstate, $Na_2O \cdot W_4O_{12}$ | 150 |
| 30 | Sodium paratungstate, $Na_2O \cdot W_2O_7 \cdot 2H_2O$ | 180 |
| 31 | Rhenium (IV) oxide, $ReO_2$ | 4,100 |
| 32 | Rhenium (VI) oxide, $ReO_3$ | 240 |
| 33 | Rhenium (VII) oxide, $Re_2O_7$ | 100 |
| 34 | Dipotassium rhenate, $K_2ReO_3$ | 50 |
| 35 | Sodium perrhenate, $NaReO_4$ | (1) |
| 36 | Potassium perrhenate, $KReO_4$ | (1) |
| 37 | Sodium permolybdate, $NaMoO_4 \cdot 3H_2O$ | (1) |
| 38 | An equivalent mixture of potassium pertungstate and potassium permolybdate, $K_2W_2O_8 + KMoO_4$. | (1) |
| 39 | An equivalent mixture of sodium ortho tungstate and sodium molybdate, $Na_2O \cdot WO_3 + Na_2MoO_4$. | 50 |
| 40 [2] | Potassium hydroxide, KOH | 800 |
| 41 | No catalyst | 20,000 |

[1] Not detected.
[2] In this run, iminocyanocyclopentane and ω-cyanovaleramide were formed.

EXAMPLE 4

The reaction was carried out in the same manner as in Example 3 except that the amount of catalyst, temperature and pressure were altered. The time required to reduce the BCE concentration in the reaction solution to 50 p.p.m. after the reaction has been completed was measured and taken as an indication of BCE decomposition ability of the catalyst.

The results are shown in Table 4.

TABLE 4

| Run No. | Catalyst | Amount of catalyst added to the reaction solution, p.p.m. | Reaction temperature (° C.) | Reaction pressure (mm. Hg) | Time (min.) |
|---|---|---|---|---|---|
| 42 | Sodium perrhenate, $NaReO_4$ | [1] 1 | 190 | 70 | 1 |
| 43 | do | 1,000 | 190 | 70 | 5 |
| 44 | do | 10 | 190 | 70 | 50 |
| 45 | Molybdenum (VI) oxide, $MoO_3$ | 300 | 220 | 760 | 20 |
| 46 | do | 300 | 220 | 70 | 14 |
| 47 | do | 300 | 170 | 70 | 120 |
| 48 | Sodium orthotungstate, $Na_2O \cdot WO_3$ | 500 | 150 | 100 | 35 |
| 49 | do | 500 | 200 | 100 | 35 |
| 50 | do | 500 | 230 | 100 | 5 |

[1] Percent.

EXAMPLE 5

Into an autoclave equipped with a magnetic stirrer, there was charged crude adiponitrile (100 g.) containing 2% by weight of BCE, to which was added the catalyst as detailed in the following Table 5. The system was sealed and heated to react at 200° C. for 30 minutes with stirring, and then cooled. The results are shown in Table 5.

TABLE 5

| Run No. | Catalyst | BCE concentration after reaction, p.p.m. |
|---|---|---|
| 51 | Lithium paratungstate, $5Li_2O \cdot 12WO_3$ | 60 |
| 52 | Potassium pertungstate, $K_2O \cdot W_2O_7$ | (1) |
| 53 | Potassium permolybdate, $KMoO_4$ | (1) |
| 54 | Sodium orthotungstate, $Na_2O \cdot WO_3$ | 50 |
| 55 | Rhenium (VI) oxide, $ReO_3$ | 180 |

[1] Not detected.

EXAMPLE 6

Crude adiponitrile obtained by reductive dimerization of acrylonitrile by electrolysis and subjected to an ordinary purification treatment (containing 90% by weight of ADN, 2.3% by weight of BCE, a small amount each of acrylonitrile, propionitrile, water and α-methylglutaronitrile) was evaporated under a vacuum of 20 mm. Hg. The vapor was passed through a 30 cm. long glass tube packed with sodium molybdate and maintained at 220° C. at a flow rate of 2 cm./sec. The observation showed that BCE concentration was reduced to 70 p.p.m.

It is within the scope of this invention to utilize the catalyst set forth herein as a solid either in fixed or fluid form as a flooded or trickle bed. Where such catalyst is used in solid, undissolved form, it can be used as such or it can be used in combination with a suitable substrate. This substrate may be any one of those which are conventionally known in the catalyst art. These include alumina, silica, kieselguhr, diatomaceous earth, etc. The catalyst may be impregnated into and/or onto such substrate from a suitable solution, preferably aqueous, followed by evaporation of the solvent. Other known deposition methods can be used.

What is claimed is:

1. A method of purifying crude adiponitrile containing as an impurity bis-cyanoethyl ester to decompose said bis-cyano ethyl ether which comprises contacting said crude material, at a bis-cyano ethyl ether decomposition temperature of about 0 to 400° C., with a catalytic amount of at least one catalyst comprising a compound of at least one polyvalent metal selected from the group consisting of chromium, manganese, molybdenum, tungsten and rhenium in a valance state of at least 3 which compound is a member selected from the group consisting of:

(A) an oxide of said polyvalent metal;
(B) an alkaline earth metal compound having as its anion a member selected from the group consisting of chromates, manganates, bichromates, permanganates, manganic sulfates, chromic sulfates and mixtures thereof;
(C) an alkali metal compound having as its anion a member selected from the group consisting of chromates, manganates, molybdates, tungstates, rhenates, bichromates, permanganates, permolybdates, pertungstates, perrhenates, manganic sulfates, chromic sulfates and mixtures thereof; and
(D) ammonium chromate.

2. Method as claimed in claim 1, carried out at 150 to 230° C.

3. Method as claimed in claim 1, wherein said catalyst is present in a proportion of at least about 0.0001 mol per mol of bis-cyanoethyl ether.

4. Method as claimed in claim 1, wherein said catalyst is present in a proportion of at least about 0.001–0.1 mol per mol of bis-cyanoethylether.

5. Method as claimed in claim 1, wherein said catalyst is a member selected from the group consisting of chromium (III) oxide, chromium (IV) oxide, ammonium chromate, potassium bichromate, manganese (III) oxide, trimanganese tetra oxide, potassium manganese alum, manganese (IV) oxide, magnesium manganate, potassium permanganate, sodium manganate, molybdenum (IV) oxide, molybdenum (VI) oxide, disodium molybdate, sodium molybdate, potassium permolybdate, tungsten (IV) oxide, tungsten (VI) oxide, sodium orthotungstate, sodium paratungstate, rhenium (IV) oxide, rhenium (VI) oxide, rhenium (VII) oxide, dipotassium rhenate, sodium perrhenate, potassium perrhenate, sodium permolybdate, lithium paratungstate, potassium paratungstate, and mixtures thereof.

6. Method as claimed in claim 1, wherein said catalyst is potassium bichromate.

7. Method as claimed in claim 1, wherein said catalyst is sodium bichromate.

8. Method as claimed in claim 1, wherein said catalyst is potassium permanganate.

9. Method as claimed in claim 1, wherein said catalyst is sodium permanganate.

10. Method as claimed in claim 1, wherein said catalyst is chromium (VI) oxide.

11. Method as claimed in claim 1, wherein said catalyst is potassium permolybdate.

12. Method as claimed in claim 1, wherein said catalyst is sodium orthotungstate.

13. Method as claimed in claim 1, wherein said catalyst is potassium perrhenate.

14. Method as claimed in claim 1, wherein said catalyst is sodium perrhenate.

15. Method as claimed in claim 1, wherein said crude adiponitrile is heated in the presence of a mixture of potassium permanganate and sodium bichromate.

16. Method as claimed in claim 1, wherein said catalyst is potassium pertungstate.

17. Method as claimed in claim 1, wherein said catalyst is sodium pertungstate.

18. Method as claimed in claim 1, wherein said crude adiponitrile is heated in the presence of a mixture of potassium permanganate and potassium bichromate.

References Cited

UNITED STATES PATENTS 3,280,168  10/1966  Campbell et al. __ 260—465.8 X
3,493,597  2/1970   Campbell et al. __ 260—465.8 X JOSEPH PAUL BRUST, Primary Examiner U.S. Cl. X.R.

260—464, 465.4, 465.6, 465.9

UNITED STATES PATENT OFFICE
CERTIFICATE OF CORRECTION

Patent No. 3,647,855     Dated March 7, 1972

Inventor(s) Maomi Seko et al

It is certified that error appears in the above-identified patent and that said Letters Patent are hereby corrected as shown below:

Col. 4, line 2

"or" should be -- of --;

Col. 4, line 32

"Run 12" should be -- Run 11 --;

Col. 4, line 33

"perchromate" should be -- bichromate --;

Col. 4, line 34

"Run 13" should be -- Run 12 --.

Col. 7, claim 1, line 2

"ester" should be -- ether --.

Signed and sealed this 3rd day of April 1973.

(SEAL)
Attest:

EDWARD M. FLETCHER, JR.
Attesting Officer

ROBERT GOTTSCHALK
Commissioner of Patents